US005463567A

United States Patent [19]

Boen et al.

[11] Patent Number: 5,463,567

[45] Date of Patent: Oct. 31, 1995

[54] APPARATUS AND METHOD FOR PROVIDING HISTORICAL DATA REGARDING MACHINE OPERATING PARAMETERS

[75] Inventors: Charles G. Boen; John M. Hadank, both of Dunlap; Kenneth J. McGuire; David R. Schricker, both of Peoria; Rolland D. Scholl, Dunlap, all of Ill.

[73] Assignee: Caterpillar Inc., Peoria, Ill.

[21] Appl. No.: 137,853

[22] Filed: Oct. 15, 1993

[51] Int. Cl.$^6$ ........................ G01M 17/00; G01M 19/00; G06F 11/00

[52] U.S. Cl. ................ 364/551.01; 364/550; 364/424.03

[58] Field of Search .............................. 364/550, 551.01, 364/551.02, 554, 424.03, 424.04; 368/8

[56] References Cited

U.S. PATENT DOCUMENTS

| | | | |
|---|---|---|---|
| 3,516,063 | 6/1970 | Arkin et al. | 340/163 |
| 3,792,445 | 2/1974 | Bucks et al. | 340/172.5 |
| 3,864,731 | 2/1975 | Callahan | 360/5 |
| 4,035,621 | 7/1977 | Kemp | 235/151.3 |
| 4,067,061 | 1/1978 | Juhasz | 364/900 |
| 4,072,850 | 2/1978 | McGlynn | 364/424 |
| 4,093,939 | 6/1978 | Mitchell | 340/52 F |
| 4,223,302 | 9/1980 | Hocking | 340/525 |
| 4,258,421 | 3/1981 | Juhasz et al. | 364/424 |
| 4,267,569 | 5/1981 | Baumann et al. | 364/431 |
| 4,376,298 | 3/1983 | Sokol | 364/551 |
| 4,525,783 | 6/1985 | Pischke et al. | 364/431.11 |
| 4,542,461 | 9/1985 | Eldridge et al. | 364/424 |
| 4,707,791 | 11/1987 | Hmelovsky et al. | 364/431.04 |
| 4,757,454 | 7/1988 | Hisatake et al. | 364/424 |
| 4,800,378 | 1/1989 | Putrow et al. | 340/722 |
| 4,839,835 | 6/1989 | Hagenbuch | 364/567 |
| 4,843,557 | 6/1989 | Ina et al. | 364/431.77 |
| 4,843,578 | 6/1989 | Wade | 364/565 |
| 4,899,338 | 2/1990 | Wroblewski | 370/85.1 |
| 4,926,331 | 5/1990 | Windle et al. | 364/424.04 |
| 4,939,652 | 7/1990 | Steiner | 364/424.04 |
| 4,967,143 | 10/1990 | Raviglione et al. | 324/73.1 |
| 4,975,848 | 12/1990 | Abe et al. | 364/424.03 |
| 4,977,389 | 12/1990 | Shiraishi | 340/461 |
| 5,034,889 | 7/1991 | Abe | 364/424.04 |
| 5,041,980 | 8/1991 | Maddock et al. | 364/431.03 |
| 5,050,080 | 9/1991 | Abe | 364/424.04 |
| 5,091,858 | 2/1992 | Paielli | 364/431.12 |
| 5,109,696 | 5/1992 | Bright et al. | 73/118.1 |
| 5,150,609 | 9/1992 | Ebner et al. | 73/117.3 |
| 5,157,610 | 10/1992 | Asano et al. | 364/424.03 |
| 5,214,582 | 5/1993 | Gray | 364/424.03 |
| 5,257,190 | 10/1993 | Crane | 364/424.03 |
| 5,303,163 | 4/1994 | Ebaugh et al. | 364/550 |

FOREIGN PATENT DOCUMENTS

89/12279 12/1989 WIPO .

OTHER PUBLICATIONS

SAE Technical Paper 912683 entitled "Integrated Diagnostics for the Vehicle System" dated Nov. 18, 1991 by Janice M. Lukich and Wayne D. Brandt.

Article entitled "Maintenance—Vital Signs Monitoring" from World Mining Equipment dated Jan. 1990.

"Introducing the Vital Signs Monitor, plus Load Weighing System" from Marathon LeTourneau dated 1988.

Article VSM Specifications—Marathon Le Tourneau Company, Heavy Equipment, no date.

Article Published in World Mining Equipment Magazine Entitled "Maintenance Vital Signs Monitoring" Jan. 1990 Edition.

*Primary Examiner*—Emanuel T. Voeltz
*Assistant Examiner*—M. Kemper
*Attorney, Agent, or Firm*—Steven R. Janda; Thomas J. Bluth

[57] ABSTRACT

When compiling machine performance data it is advantageous for such data to have been acquired during periods in which the machine was in the same general operating state. The subject invention provides a system for producing historical data regarding machine operating parameters and including a plurality of sensors for producing signals indicative of the level of machine parameters. A control is included for selecting data representative of a first operating parameter in response to a dependency definition being satisfied and for processing the selected data to provide an indication of machine performance.

16 Claims, 3 Drawing Sheets

APPARATUS AND METHOD FOR PROVIDING HISTORICAL DATA REGARDING MACHINE OPERATING PARAMETERS

TECHNICAL FIELD

This invention relates generally to a machine diagnostic system and more particularly to a system for selectively processing operating parameter data to provide data indicative of machine performance.

BACKGROUND ART

For service and diagnostic purposes, machines are sometimes equipped with sensors for measuring operating conditions such as engine RPM, oil pressure, water temperature, boost pressure, oil contamination, electric motor current, hydraulic pressure, system voltage, and the like. In some cases, storage devices are provided to compile a data base for later evaluation of machine performance and to aid in diagnosis. Service personnel examine the accrued data to get a better picture of the causes of the failure or to aid in diagnosis. Similarly, service personnel can evaluate the stored data to predict future failures and to correct any problems before total component failure. In addition, these stored parameters may be examined by service or supervisory personnel to evaluate machine and/or operator performance to ensure maximum productivity of the machine. These issues are particularly pertinent to over-the-highway trucks and large work machines such as off-highway mining trucks, hydraulic excavators, track-type tractors, wheel loaders, and the like. These machines represent large capital investments and are capable of substantial productivity when operating. It is therefore important to predict failures so servicing can be scheduled during periods in which productivity will be less affected and so minor problems can be repaired before they lead to catastrophic failures.

Systems that have been used in the past to store all data produced by the machine sensors do not adequately address the needs of service personnel because such data is acquired while the machine is at substantially different operating conditions. For example, some of the data is acquired while the engine is idling while other of the data is acquired while the engine is under full load. Because of this, it is nearly impossible for service personnel to compare data acquired under such different circumstances and to observe any meaningful trends in the sensed parameters. This is a critical drawback for these systems since it is an examination of trends in the sensed parameters and comparisons between trends of multiple parameters that can be most useful during diagnosis and in predicting future failures.

Similarly, it is sometimes advantageous to accumulate parameters only when the machine is in a particular operating condition. This type of information is predominantly used during performance evaluation but may also be used in failure diagnosis and prognosis. For example, the length of time spent in a particular gear while the machine is loaded may be needed to evaluate machine performance. Without more, if service personnel can only look at a historical profile of each parameter, it is difficult to accurately determine the length of time the machine is operating in a particular gear while it is under load or in any other operating condition. Similarly, it is often desirable to provide information to supervisors regarding the length of time and fuel consumed while the machine is idling. To obtain such information would require service or supervisory personnel to carry out the burdensome task of manually calculating periods in which the engine is idling.

To further aid in diagnostics, it is beneficial to package information in such a way that analysis is simplified as much as possible. Since many sensed parameters are interrelated, service personnel often need to examine them together. Unfortunately, if data representing the parameters are stored separately, it is burdensome for service personnel to accurately and effectively study the interrelationship between the parameters. It would therefore be helpful to provide multi-dimensional histograms representing the interrelationship between multiple variables.

The present invention is directed to overcoming one or more of the problems set forth above.

DISCLOSURE OF THE INVENTION

The invention avoids the disadvantages of known machine systems for providing indications of historical operating data and provides for processing and storing operating parameter data in response to the level of sensed dependencies. The invention thus allows data to be selected for processing only when the machine is in the same general operating state such that the stored data is more directly comparable.

In one aspect of the present invention, a system for providing historical data regarding machine operating parameters is provided and includes a plurality of sensors for producing signals indicative of the level of machine parameters. A control is included for selecting data representative of a first operating parameter in response to a dependency definition being satisfied and for processing the selected data to provide an indication of machine performance.

In a second aspect of the present invention, a method for providing historical data regarding machine operating parameters is provided and includes the steps of producing signals indicative of the level of machine operating parameters; selecting data representative of a first operating parameter in response to a dependency definition being satisfied; processing the selected data to provide an indication of machine performance; and storing the processed data.

The invention also includes other features and advantages that will become apparent from a more detailed study of the drawings and specification.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
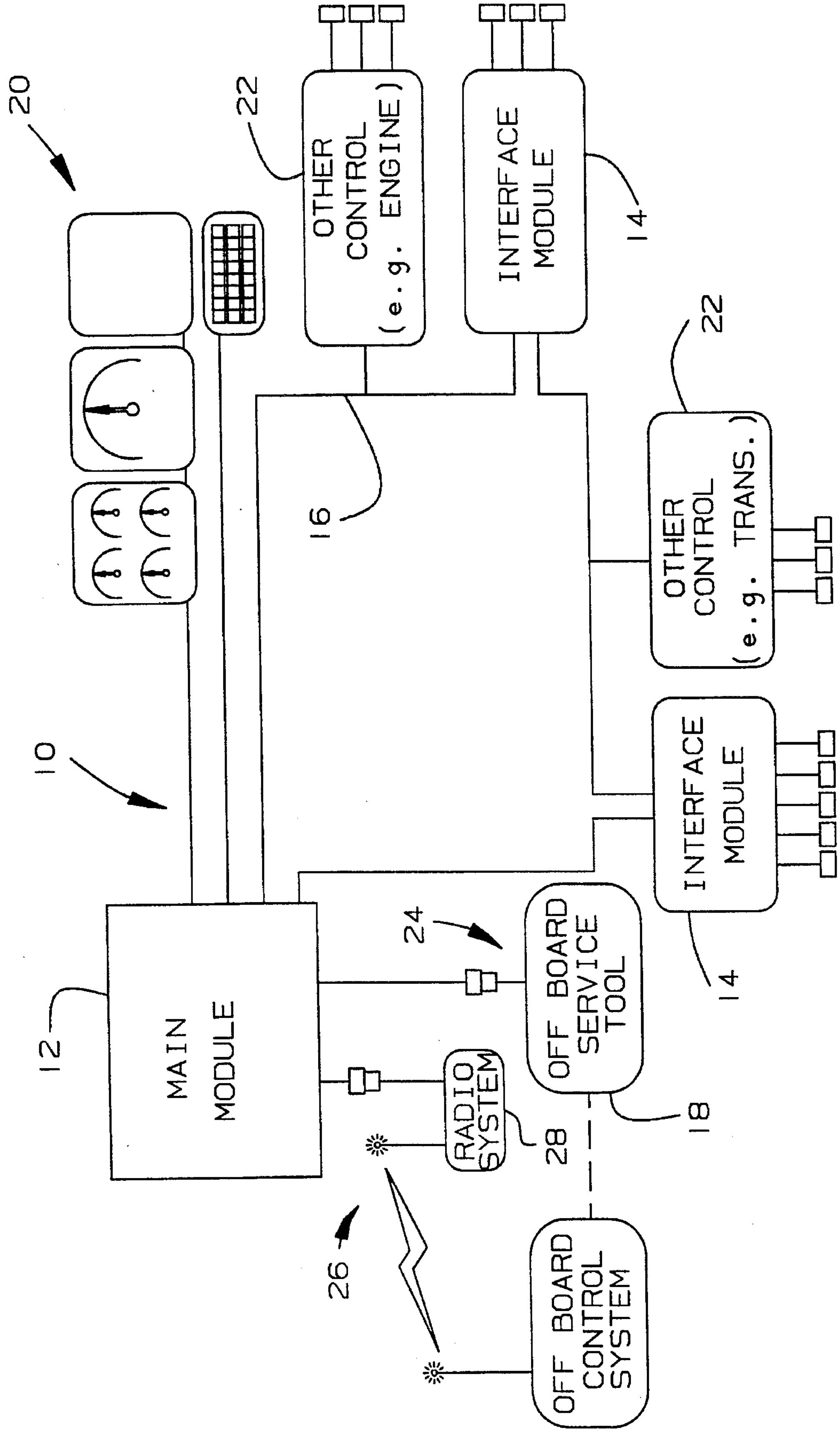
FIG. 1 is a diagrammatic view of a machine monitoring and control system.

Referring to FIG. 1, a machine monitoring system is shown generally by the number 10 and is a data acquisition, analysis, storage, and display system for work machines. Employing a complement of on-board and off-board hardware and software, the machine monitoring system 10 will monitor and derive machine component information and make such information available to the operator and technical experts in a manner that will improve awareness of machine operating condition and ease diagnosis of problems.

Sensor data is gathered by interface modules 14 that communicate the data by a high-speed communication ring 16 to the main module 12, where it is manipulated and then stored until downloaded to an off-board control system 18. It should be noted that while this describes the preferred embodiment, other suitable hardware arrangements may be used without deviating from the invention.

Subsets of the data are also transmitted to a display module 20 for presentation to the operator in the form of gauges and warning messages. During normal operation, gauge values are displayed in the operator compartment. During out-of-spec conditions, alarms and warning/instructional messages are also displayed. A keypad is provided to allow entry of data and to allow system-level requests in the absence of a service tool. A message area is provided and includes a dot-matrix LCD to display text messages in the memory-resident language and in SI or non-SI units. A dedicated backlight will be employed for viewing this display in low ambient light conditions. The message area is used to present information regarding the state of the machine.

While the main, interface, and display modules 12, 14, 20 comprise the baseline machine monitoring system 10, additional on-board controls 22, such as engine and transmission controls, may be integrated into this architecture via the communication ring 16 in order to acquire the additional data being sensed or calculated by these controls and to provide a centralized display and storehouse for all on-board controls diagnostics.

Two separate serial communication lines will be provided by the machine monitoring system 10. One line 24, intended for routine uploading and downloading of data to a service tool, will feed two serial communication ports, one in the operator compartment and one near the base of the machine. The second serial line 26 will feed a separate communications port intended for telemetry system access to allow the machine monitoring system 10 to interface with a radio system 28 in order to transmit machine warnings and data off-board and to provide service tool capabilities via telemetry. Thus the machine monitoring system 10 is allowed to communicate with an off-board system 18 via either a direct, physical communication link or by telemetry. In the preferred embodiment, the off-board system 18 includes a microprocessor and is advantageously a commercially available personal computer; however, other types of microprocessor-based systems capable of sending and receiving control signals and other data may be used without deviating from the invention.

The wiring connections of the rear of the connector should be sealed. The ground-level connector should be sealed by a dust and moisture proof spring-loaded cover or removable cap. If removable, the cap would preferably be screw-on with a retaining chain to prevent loss.

Parameter data and system diagnostics are acquired from sensors and switches distributed about the machine and from other on-board controllers 22 whenever the ignition is on. Data is categorized as either internal, sensed, communicated, or calculated depending on its source. Internal data is generated and maintained within the confines of the main module 12. Examples of internal data are the time of day and date. Sensed data is directly sampled by sensors connected to the interface modules and include pulse-width modulated sensor data, frequency-based data, and switch data that has been effectively debounced. Sensed data is broadcast on the communication ring 16 for capture by the main module 12 or one or more of the other on-board controllers 22. Communicated data is that data acquired by other on-board controllers 22 and broadcast over the communication ring 16 for capture by the main module 12. Calculated data channel values are based on internal, acquired, communicated, or the calculated data channels. Service meter, clutch slip, machine load, and fuel consumption are calculated parameters.

The total number of data channels available for the broadcast of parameters is limited only by the bandwidth of the communication ring 16 that interconnects the various modules and controllers. In the preferred embodiment, the data being transmitted in the communication ring 16 is packetized with headers preceding the data value to identify the data within the packet. The data is preferably fixed format serial bit streams. Typically, each data message begins with a Message Identification (MID) character; followed by one or more parameters. Each parameter begins with a Parameter Identification (PID) character followed by one or more parameter data characters. The data message ends with a checksum character. Each character has a start bit, 8 bits of data, and a stop bit. Alternately, the MID character could be replaced by a Source Identification (SID) character and a Destination Identification (DID) character.

To document the performance of the machine and/or its major components, performance baselines are stored in an array within the memory device located in the main module 12. These baselines are used during key, repeatable performance checks of the machine to help verify machine/component health and, as discussed below, are used as reference points to determine whether the machine is in an operating condition in which machine parameters are to be processed and stored.

Data for download to the off-board system 18 from the main module 12 includes a header having a machine identifier, a time stamp of the download, and a definition table corresponding to the type of data being downloaded. For example, if trend data is to be downloaded, the definition table is a trend definition. The header is followed with the data described below and corresponding to a dependency definition table.

It should be appreciated by those skilled in the art that data may be processed either on-board the machine in the main module 12 and then downloaded, or the data can be first downloaded with the processing occurring in the off-board system. In the preferred embodiment, the system compiles trend data, cumulative data, and histogram data for analysis by service and/or supervisory personnel.

Figure 2:
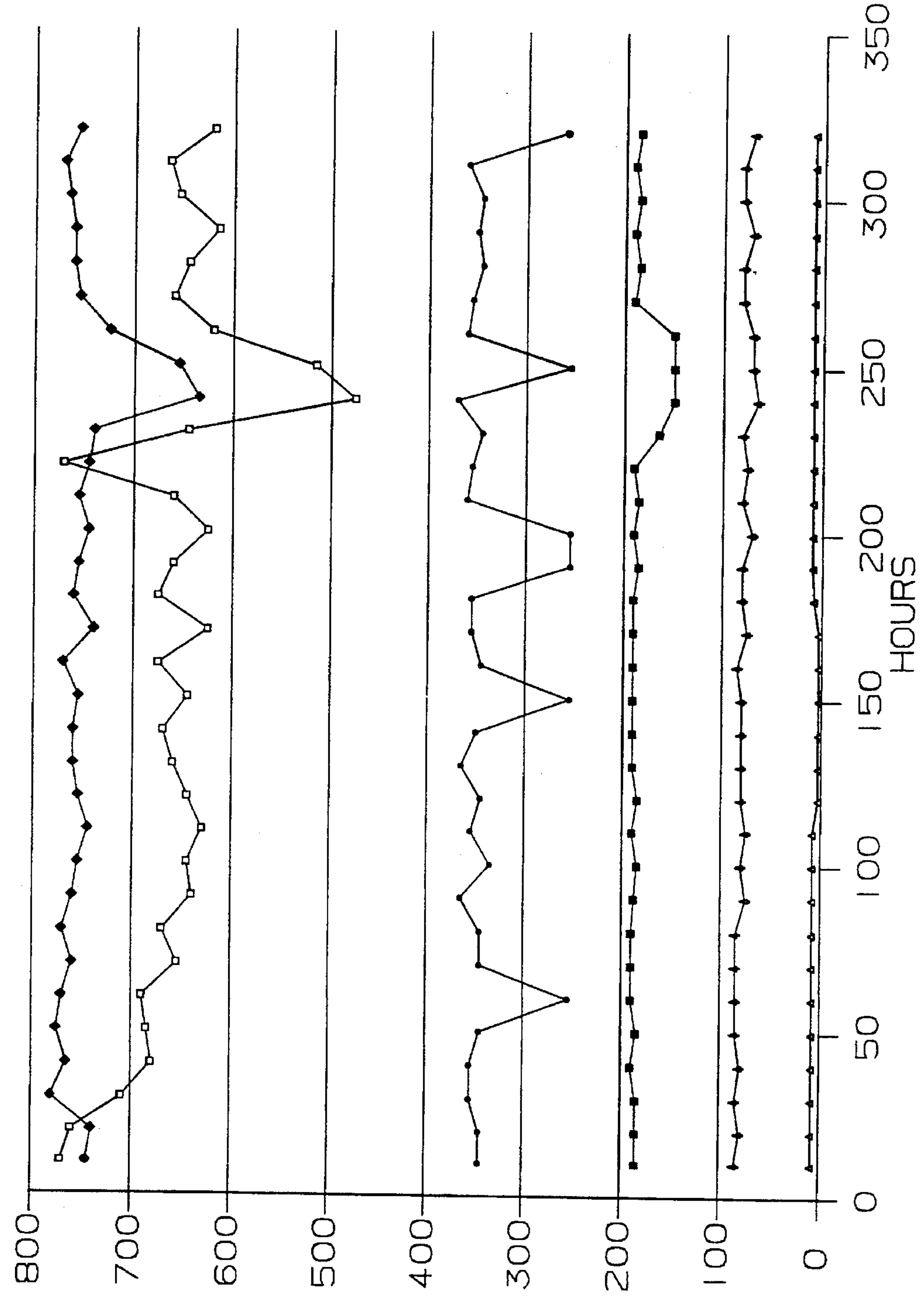
FIG. 2 is a graphical representation of trend data.

Referring now to FIG. 2, a plurality of graphs each illustrating trend data from a sensed machine parameter are shown. By viewing the trends of a plurality of sensed parameters, failures can be identified early by observing, for example, gradual declines or increases in a sensed parameter. Similarly, potential failures can be identified by anomalous changes in a plurality of parameters occurring simultaneously, such as the drop in each of the sensed parameters occurring at roughly the 250 hour point in FIG. 2. By noting which of the sensed parameters have been affected, service personnel can more easily deduce the cause of any degradation of machine performance and diagnose problems before catastrophic engine failure.

A subset of parameters for which trend data is to be produced is either predefined or defined via the off-board system 18. The trending definition for each parameter will vary and may be a function of several other machine parameters that shall be referred to as dependencies. Trend data is gathered and stored in memory as the specified dependency definition is met over a specified trend period, which is measured either in time, such as over a period of ten hours, or in counts, such as over a period of ten transmission shifts. Trend data is only obtained while the engine is running. Based on the specified trend type, the maximum, minimum, or cumulative value of data gathered during this period is then stored as a single trend point with counts to determine the average value and/or the points available. The determination of whether to use the average, maximum, or minimum value to obtain the trend point is based on the system designer's decision regarding which type of calculation would provide the best indication of changes in engine performance or impending failures. It should also be understood that multiple values could be calculated for the same sensed parameter, i.e. trend points could be calculated to indicate both an average value and a minimum value for a designated machine parameter.

The overall trend is formed by storing a specified number of points in the memory device depending on the size of the available memory area and the length of the desired historical data base. The trend information may be displayed in tabular form, in graphical form as shown in FIG. 2, or in any other suitable format to permit ease of analysis by service and/or supervisory personnel.

Trend data may be reset and the definitions may be redefined by the off-board system 18 via one of the communication ports 24,26. For example, if a particular application of the machine requires a different dependency definition for one or more of the sensed parameters, the off-board system 18 can be used to modify the dependency definition by transmitting data to the main module 12 including commands to erase a given array including a given dependency definition and replace that definition with a new dependency definition. Similarly, arrays in the memory device in the main module 12 may be erased in response to signals delivered to the main module 12 by the off-board system 18 via one of the communication ports 24,26.

It should be noted that the dependency definition for each operating parameter may be different from or the same as the definition for other operating parameters. For example, the dependency definition for transmission clutch slip time is preferably satisfied when the engine rack setting is greater than a predetermined level and when the transmission oil temperature is greater than a predefined operating temperature. In the preferred embodiment, there are also situations in which a single operating parameter, for example engine oil pressure, is associated with two different dependency definitions. That is, two arrays will be defined in the memory device for engine oil pressure: one for storing engine oil pressure data when the engine is in a first operating condition and a second array for storing engine oil pressure data when the engine is in a second operating condition.

Cumulative data involves a subset of sensed parameters that are defined by the off-board system and whose values are accumulated until reset. Dependencies are assigned to some of the parameters such that values are only accumulated when specified conditions are met. For example, time and fuel consumption are accumulated when the engine is idling, which is indicated by engine rpm being greater than a first level and less than a second level. Similarly, the time in which the machine is in any particular transmission gear while the machine is under load is accumulated only when engine rpm is within a predefined range and the engine rack setting is greater and a predetermined level. It should be understood that the actual ranges, minimums, and maximums used in the dependency definitions are determined empirically to define the operating condition of interest and will vary from machine to machine and application to application. The cumulative data may also be reset by the off-board system 18. In the preferred embodiment, data is only accumulated when the engine is running.

Histograms are maintained for parameters as specified by the off-board system. At the specified update rate, counts within the appropriate histogram cells will accumulate when specified dependencies are met. Multidimensional histograms will be computed if the specified dimensions are greater than one. For example, the preferred embodiment includes a multidimensional array in the memory device for storage of engine RPM and rack setting to produce a multidimensional histogram. The definition of multidimensional histograms is based on the system designer's desire to allow easy correlation of related machine parameters.

Per dimension, the following information must be defined: the name of the parameter, the rate at which cell counts are updated, the number of cells into which parameter data is divided, whether the histogram is of a type in which the range of data within each cell is fixed or variable, the minimum parameter value to be histogrammed, and the size of each histogram cell. If the type of histogram is fixed, only one cell size need be specified. If the type is variable, a size must be specified for each cell. Histogram data is only accumulated while the engine is running and may be reset by the off-board system.

Figure 3:
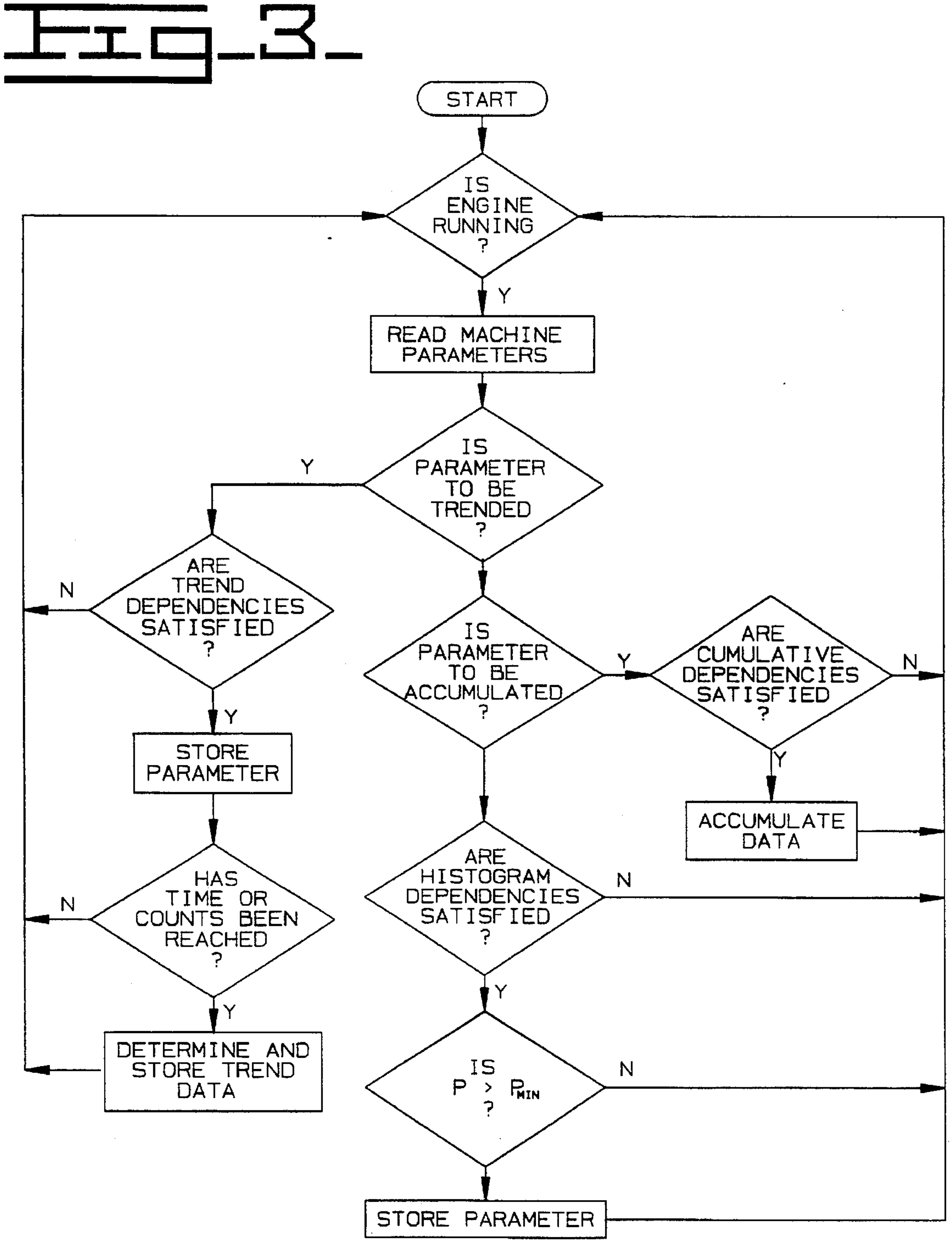
FIG. 3 represents a flow chart of an algorithm used in an embodiment of the present invention.

Referring now to FIG. 3, an algorithm incorporated in an embodiment of the invention and executed by the processor within the main module 12 to perform the above functions is now described. The processor determines whether the engine is running. Advantageously, the engine is determined to be running if engine speed exceeds cranking engine speed. If the engine is not running, then the algorithm will not proceed. If the engine is running, the main module 12 reads the sensed machine parameters from the communication ring 16. Signals representative of the sensed parameters may be transmitted to the main module 12 by the interface modules, other on-board controllers, or directly from sensors located about the machine.

For each of the sensed parameters, the main module 12 determines whether that parameter is to be processed to provide trend data. If trend data is to be provided, the trending definition is retrieved and the dependency parameters are checked to determine whether the dependency definition is satisfied. The dependency definition for each operating parameter of interest is defined in terms of other sensed machine parameters. For example, the dependency definition for boost pressure may be satisfied only when engine rpm is greater than a low operating speed and less than a high operating speed, when the engine rack setting is greater than a predetermined level, and when the jacket water temperature is greater than a predefined operating temperature. That is, values for boost pressure are only saved and processed for producing trend information when the above conditions are satisfied. In this way, all boost pressure values used to produce the trend data will have been acquired when the engine is in the same general operating condition. It should be understood that the actual ranges, minimums, and maximums used in the dependency definitions are determined empirically to define the operating conditions of interest and will vary from machine to machine and application to application.

If the dependency definition is satisfied, the value of the sensed parameter is stored. This process is continued until either the time period over which each trend point is to be determined or the number of events for which each trend point is to be determined is reached at which point the main module 12 calculates and stores the trend point. The time period or number of events is selected in response to the designer's desire for precision, the availability of memory space in the memory device, and the length of time or number of counts required to obtain meaningful trend points. The calculation of the trend point may include accumulating the stored values, selecting the maximum stored value, or selecting the minimum stored value. The calculated trend point is saved and the data array for that parameter is then cleared to allow for the storage of data for calculation of the next trend point for that parameter.

For each of the sensed parameters, the main module 12 also determines whether that parameter is to be processed to provide cumulative data. If cumulative data is to be provided, the dependency definition is retrieved and the dependency parameters are checked to determine whether the dependency definition is satisfied. The dependency definition for each operating parameter of interest is defined in terms of other sensed machine parameters. If the dependency definition is satisfied, the main module 12 adds the value of the sensed parameter to the value stored in the memory device representing the cumulative value for that parameter since that memory location was cleared.

Similarly, for each of the sensed parameters, the main module 12 determines whether that parameter is to be processed to provide histogram data. If histogram data is to be provided, the dependency definition is retrieved and the dependency parameters are checked to determine whether the dependency definition is satisfied. The dependency definition for each operating parameter of interest is defined in terms of other sensed machine parameters. If the dependency definition is satisfied, the level of the machine parameter of interest is compared with a predefined minimum value. If the minimum is exceeded, then the main module 12 stores the value of the sensed parameter in a predefined array in the memory device representing a historical data base of sensed values for that parameter since the array was cleared.

The above processes are advantageously repeated for each of the sensed parameters received by the main module 12. It should be further understood that one or more of the sensed parameters may be used to provide all or any combination of trend, cumulative, and histogram data and are not limited to any single type of processing.

INDUSTRIAL APPLICABILITY

Work machines such as over-the-highway trucks and large mining and construction machines represent large capital investments and significantly reduce overall productivity for the owner when they are being repaired. To reduce the loss of productivity, the present invention is used to provide service and supervisory personnel with historical data relating to sensed machine parameters. This historical data is then used to diagnose failures, predict future failures, and evaluate machine and/or operator performance.

The historical data is presented in various forms, including trend data, cumulative data, and histograms. The system acquires data relating to machine parameters only when the machine is in the same general operating condition to ensure that the processed data is truly comparable and can be used more effectively for prognosis and diagnosis of engine and component failures.

Other aspects, objects, advantages and uses of this invention can be obtained from a study of the drawings, disclosure, and appended claims.

We claim:

1. An apparatus for providing historical data regarding machine operating parameters, comprising:

a plurality of sensor means for producing signals indicative of the level of machine parameters, said machine parameters including a first operating parameter and two or more dependency parameters, at least one of said dependency parameters being different from said first operating parameter;

means for selecting a processing method according to which operating parameter data is to be processed;

control means for receiving said signals and selecting data representative of said first operating parameter in response to a dependency definition being satisfied and discarding data representative of said first operating parameter in response to said dependency definition being unsatisfied, said dependency definition including a plurality of predefined ranges, each of said dependency parameters corresponding to one of said predefined ranges, said dependency definition being satisfied in response to said two or more dependency parameters each being within the corresponding predefined range;

memory means for storing the level or levels associated with the predefined range for each of said dependency parameters, each of said predefined ranges being accessible by said control means; and compiling means for receiving the selected data from said control means, processing said selected data according to the selected processing method, and storing the processed data in said memory means.

2. An apparatus, as set forth in claim 1, wherein said compiling means calculates a trending point for said first operating parameter.

3. An apparatus, as set forth in claim 1, wherein said compiling means accumulates a sum of values corresponding to said first operating parameter.

4. An apparatus, as set forth in claim 1, wherein said dependency definition includes a minimum value for said first operating parameter.

5. An apparatus, as set forth in claim 1, wherein:

said machine parameters include a plurality of operating parameters, each of said plurality of operating parameters having an associated dependency definition;

said control means selects data relating to each of said plurality of operating parameters in response to the associated dependency definition being satisfied; and said compiling means produces a multidimensional histogram including selected data from said two or more operating parameters.

6. An apparatus, as set forth in claim 1, wherein the machine operating parameters relate to performance parameters on a mobile machine and including an off-board processor and a means for transferring said signals to said off-board processor; wherein said off-board processor includes said control means, compiling means, and memory means and said means for transferring said signals includes a communication port.

7. An apparatus, as set forth in claim 1, including a main module located on-board the machine, an off-board processor and a communication means for transferring signals from said off-board processor to said main module and wherein said dependency definition is established in response to a signal from said off-board processor delivered via said communication link, said main module including said control means, compiling means, and memory means.

8. An apparatus, as set forth in claim 1, including means for transferring the processed data to an off-board processor.

9. An apparatus, as set forth in claim 8, wherein said means for transferring the processed data is a radio transmitter.

10. An apparatus, as set forth in claim 8, wherein said means for transferring the processed data includes a communication port.

11. A method for providing historical data regarding machine operating parameters, comprising the steps of:

producing signals indicative of the level of machine operating parameters, said machine operating parameters including a first operating parameter and two or more dependency parameters, at least one of said dependency parameters being different from said first operating parameter;

selecting a processing method according to which operating parameter data is to be processed;

selecting data representative of said first operating parameter in response to a dependency definition being satisfied and discarding data representative of said first operating parameter in response to said dependency definition being unsatisfied, said dependency definition including a plurality of predefined ranges stored in memory, each of said dependency parameters corresponding to one of said predefined ranges, said dependency definition being satisfied in response to said two or more dependency parameters each being within the corresponding predefined range;

processing said selected data according to the selected method; and storing the processed data.

12. A method, as set forth in claim 11, wherein the step of processing said selected data includes the step of calculating a trending point for said first operating parameter.

13. A method, as set forth in claim 11, wherein said step of processing said selected data includes the step of accumulating a sum of values corresponding to said first operating parameter.

14. A method, as set forth in claim 11, wherein said dependency definition includes a minimum value for said first operating parameter.

15. A method, as set forth in claim 11, including the step of transferring the processed data to an off-board processor.

16. A method, as set forth in claim 11, including the step of establishing said dependency definition in response to a signal from an off-board processor.

* * * * *